US011650577B2

(12) United States Patent
Kurihara et al.

(10) Patent No.: US 11,650,577 B2
(45) Date of Patent: May 16, 2023

(54) PLANT OPERATION DATA MONITORING DEVICE AND METHOD

(71) Applicant: Mitsubishi Heavy Industries, Ltd., Tokyo (JP)

(72) Inventors: Tamami Kurihara, Tokyo (JP); Kengo Iwashige, Tokyo (JP); Tadaaki Kakimoto, Tokyo (JP); Tetsuji Morita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/132,311

(22) Filed: Dec. 23, 2020

(65) Prior Publication Data

US 2021/0302948 A1 Sep. 30, 2021

(30) Foreign Application Priority Data

Mar. 25, 2020 (JP) .............................. JP2020-053787

(51) Int. Cl.
*G05B 19/418* (2006.01)
*G05B 23/02* (2006.01)

(52) U.S. Cl.
CPC ... *G05B 19/41875* (2013.01); *G05B 23/0259* (2013.01); *G05B 2219/34475* (2013.01)

(58) Field of Classification Search
CPC .......... G05B 19/41875; G05B 23/0259; G05B 2219/34475
See application file for complete search history.

(56) References Cited

U.S. PATENT DOCUMENTS 9,933,338 B2 * 4/2018 Noda ................... G05B 23/024
2003/0095709 A1 * 5/2003 Zhou ......................... G06T 7/12
382/190

(Continued)

FOREIGN PATENT DOCUMENTS

JP 06-020173 A 1/1994
JP 2009-180722 A 8/2009

(Continued)

OTHER PUBLICATIONS

Extended European Search Report dated May 27, 2021 for European Patent Application No. 20215712.9.

(Continued)

*Primary Examiner* — Thomas C Lee
*Assistant Examiner* — Ameir Myers
(74) *Attorney, Agent, or Firm* — Volpe Koenig (57) ABSTRACT

A plant operation data monitoring device comprises: an input section that receives operation data on a plant; and a calculator that includes databases storing the operation data received, and a computing section executing a program. The computing section stores the operation data received in a first database of the databases in time series. The computing section determines from peak values of the operation data stored whether gradients of the operation data are positive or negative, and then stores the gradients in a second database of the databases for positive gradients or in the second database of the databases for negative gradients in time series. The computing section determines threshold values for abnormality determination about the positive and negative gradients, divides the positive gradients and the negative gradients into normal values and abnormal values, and additionally stores the divided gradients in the second database for the positive or negative gradients.

9 Claims, 7 Drawing Sheets

(56) References Cited

U.S. PATENT DOCUMENTS

| | | | |
|---|---|---|---|
| 2014/0136293 A1* | 5/2014 | Ramakrishnan .............................. G06Q 10/06375 705/7.37 | |
| 2014/0137024 A1* | 5/2014 | Curtis ....................... G06F 3/14 715/771 | |
| 2018/0004193 A1* | 1/2018 | Gugaliya ......... G05B 19/41875 | |
| 2018/0196639 A1* | 7/2018 | Fujita ...................... G06F 7/523 | |
| 2019/0026351 A1* | 1/2019 | Maor .................... G06F 16/248 | |
| 2019/0197917 A1 | 6/2019 | Endo et al. | |
| 2019/0384275 A1 | 12/2019 | Shida et al. | |
| 2020/0019150 A1 | 1/2020 | Shida et al. | |
| 2020/0410846 A1* | 12/2020 | Lee ..................... G08B 21/182 | |

FOREIGN PATENT DOCUMENTS

| | | |
|---|---|---|
| JP | 6474564 B2 | 2/2019 |
| WO | 2019/177234 A1 | 9/2019 |

OTHER PUBLICATIONS

Japanese Office Action dated Dec. 27, 2022 for the Japanese Patent Application No. 2020-053787.

\* cited by examiner

| PEAK NAME | VALUE | GRADIENT | DETERMINATION |
|---|---|---|---|
| LOWER PEAK A1 | □□ | +○○ | NORMAL |
| UPPER PEAK A2 | △△ | | |
| LOWER PEAK A2 | □□ | +○○ | NORMAL |
| UPPER PEAK A3 | △△ | | |
| LOWER PEAK A3 | □□ | +○○ | NORMAL |
| UPPER PEAK A4 | △△ | | |
| LOWER PEAK B1 | □□ | +○○ | ABNORMAL |
| UPPER PEAK B2 | △△ | | |
| LOWER PEAK B2 | □□ | +○○ | ABNORMAL |
| UPPER PEAK B3 | △△ | | |
| LOWER PEAK B3 | □□ | +○○ | ABNORMAL |
| UPPER PEAK B4 | △△ | | |
| | | | |
| | | | |

FIG. 5

| PEAK NAME | VALUE | GRADIENT | DETERMINATION |
|---|---|---|---|
| UPPER PEAK A1 | △△ | —○○ | NORMAL |
| LOWER PEAK A1 | □□ | | |
| UPPER PEAK A2 | △△ | —○○ | NORMAL |
| LOWER PEAK A2 | □□ | | |
| UPPER PEAK A3 | △△ | —○○ | NORMAL |
| LOWER PEAK A3 | □□ | | |
| UPPER PEAK A4 | △△ | —○○ | NORMAL |
| LOWER PEAK A4 | □□ | | |
| UPPER PEAK B1 | △△ | —○○ | ABNORMAL |
| LOWER PEAK B1 | □□ | | |
| UPPER PEAK B2 | △△ | —○○ | ABNORMAL |
| LOWER PEAK B2 | □□ | | |
| UPPER PEAK B3 | △△ | —○○ | ABNORMAL |
| LOWER PEAK B3 | □□ | | |
| UPPER PEAK B4 | △△ | —○○ | ABNORMAL |
| LOWER PEAK B4 | □□ | | |

PLANT OPERATION DATA MONITORING DEVICE AND METHOD

CLAIM OF PRIORITY

The present application claims priority from Japanese Patent Application JP 2020-053787 filed on Mar. 25, 2020, the content of which is hereby incorporated by reference into this application

BACKGROUND OF THE INVENTION

The present invention relates to a plant operation data monitoring device and method to monitor operation data from equipment included in a plant and to enable early detection of abnormalities.

In various kinds of plants, monitoring operation data sent from equipment included in a plant is widely performed to detect abnormality occurring in the equipment at an early stage.

In many of the techniques, abnormality is determined by monitoring whether or not operation data and/or estimation data obtained from the operation data deviate from a predetermined threshold value or a predetermined threshold range. Alternatively, abnormality is determined when the physical correlation to be satisfied between operation data is not satisfied.

A techniques "determination system and method of deterioration state for facilities" disclosed in Japanese Patent No. 06474564 is known as an example of concreate and practical techniques for early detection of abnormality.

The technique using relation with other operation data as disclosed in Japanese Patent No. 06474564 is an effective technique when the physical correlation between operation data is high.

However, when operation data has a low physical correlation between operation data (a low degree of physical, engineering relation) and has high independency (low dependency), it is difficult to make determination on abnormality using relation with other operation data. Because of this, there is a need for a technique to determine abnormality or abnormality symptoms only from the operation data itself.

SUMMARY OF THE INVENTION

Accordingly, it is an object of the present invention to provide a plant operation data monitoring device and method suitably for operation data with a low degree of physical correlation and high independency.

A plant operation data monitoring device of the present invention comprises: an input section that receives operation data on a plant; and a calculator that includes databases storing the operation data received, and a computing section executing a program. The computing section stores the operation data received in a first database of the databases in time series. The computing section determines from peak values of the operation data stored whether gradients of the operation data are positive or negative, and then stores the gradients in a second database of the databases for positive gradients or in the second database of the databases for negative gradients in time series. The computing section determines threshold values for abnormality determination about each of the positive and negative gradients, divides each of the positive gradients and the negative gradients into normal values and abnormal values, and additionally stores the divided gradients in the second database for the positive gradients or the negative gradients.

A plant operation data monitoring method of the present invention receives operation data on a plant and monitors abnormality in the plant by using the operation data received. The method comprises the steps of: storing the operation data received in time series; determining from peak values of the operation data stored whether gradients of the operation data are positive or negative, and then storing the gradients in time series; determining threshold values for abnormality determination about each of the positive and negative gradients; dividing each of the positive gradients and the negative gradients into normal values and abnormal values; and storing additionally the divided gradients for the positive gradients or the negative gradients.

According to the present invention, it is possible to provide a plant operation data monitoring device and method suitably for operation data with a low degree of physical correlation and high independency.

DETAILED DESCRIPTION OF THE PREFERRED EMBODIMENT

An embodiment of plant operation data monitoring device and method according to the present invention will now be described with the drawings.

Embodiment

Figure 1:
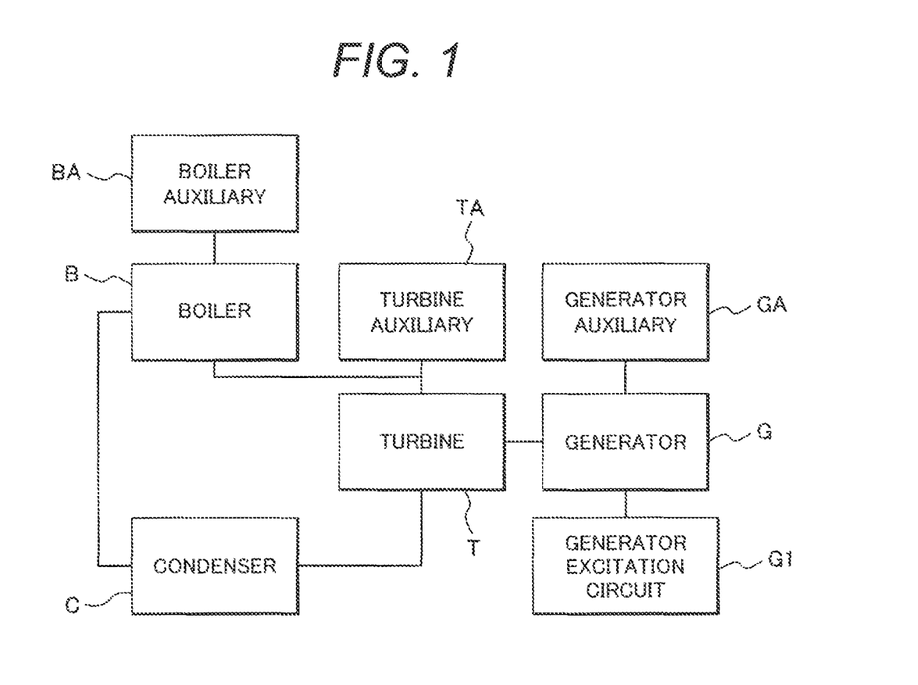
FIG. 1 is a block diagram illustrating an example configuration of equipment in a thermal power plant which is a specific example of application of the present invention.

FIG. 1 illustrates an example configuration of equipment in a thermal power plant which is a specific example of application of a plant operation data monitoring device according to an embodiment of the present invention.

The thermal power plant illustrated in FIG. 1 includes components roughly grouped into a generator G, a turbine T, and a boiler B, which are called main machinery. Equipment or equipment groups installed for maintaining the functionality of the main machinery is called auxiliaries. In FIG. 1, auxiliaries includes a generator auxiliary GA, a turbine auxiliary TA, and a boiler auxiliary BA, and may include a condenser C and a generator excitation circuit G1.

A typical plant includes a large number of such components. In the embodiment, attention is directed to operation data on such plant components, and a calculator receives the operation data via a sensor, a communication section, an input section, and others. A configuration for this purpose is well-known.

Figure 2:
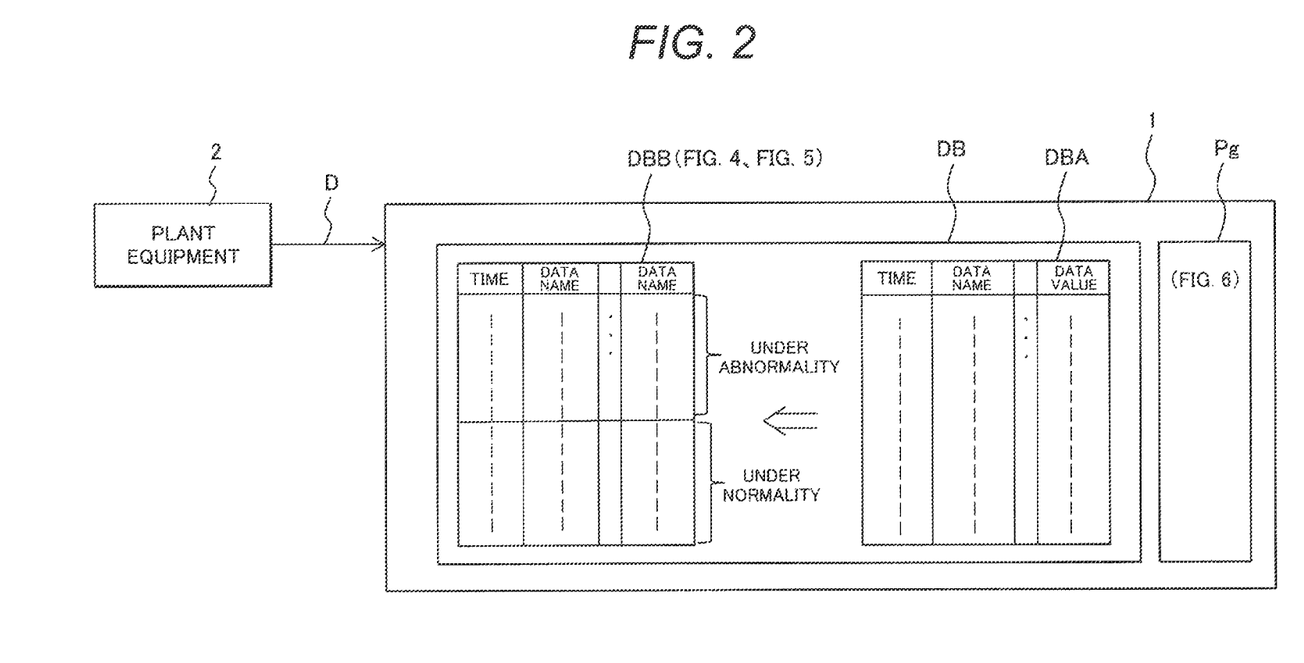
FIG. 2 is a diagram illustrating an example configuration of a typical plant operation data monitoring device.

FIG. 2 is a diagram illustrating an example configuration of a typical plant operation data monitoring device. In FIG. 2, a plant operation data monitoring device 1 configured with a calculator receives plant operation data D from a sensor/sensors (not shown in FIG. 2) in plant equipment 2 into the calculator via a communication section or an input section. The operation data D in this embodiment may be operation data with a low physical correlation between operation data (a low degree of physical, engineering relation), and thus can be received at any regular intervals irrespective of an interval at which another operation data is received. Examples of the operation data with a low physical correlation between operation data (a low degree of physical, engineering relation) and high independency include electrical conductivity of stator cooling water in the generator, concentrations of hydrogen filled in the generator, hydrogen purity, and hydrogen pressure.

In the calculator 1, the operation data D is stored in an internal database DB in time series. In this case, a storage format in an early stage is, as illustrated in a database DBA, to relate at least a data collection time, name of the operation data, and values of the operation data with each other and to store them in time series.

The calculator 1 also has processing program Pg stored therein. The processing program Pg describes processing procedure to handle the received operation data D. The received operation data is processed and executed sequentially according to the processing program Pg.

Figure 6:
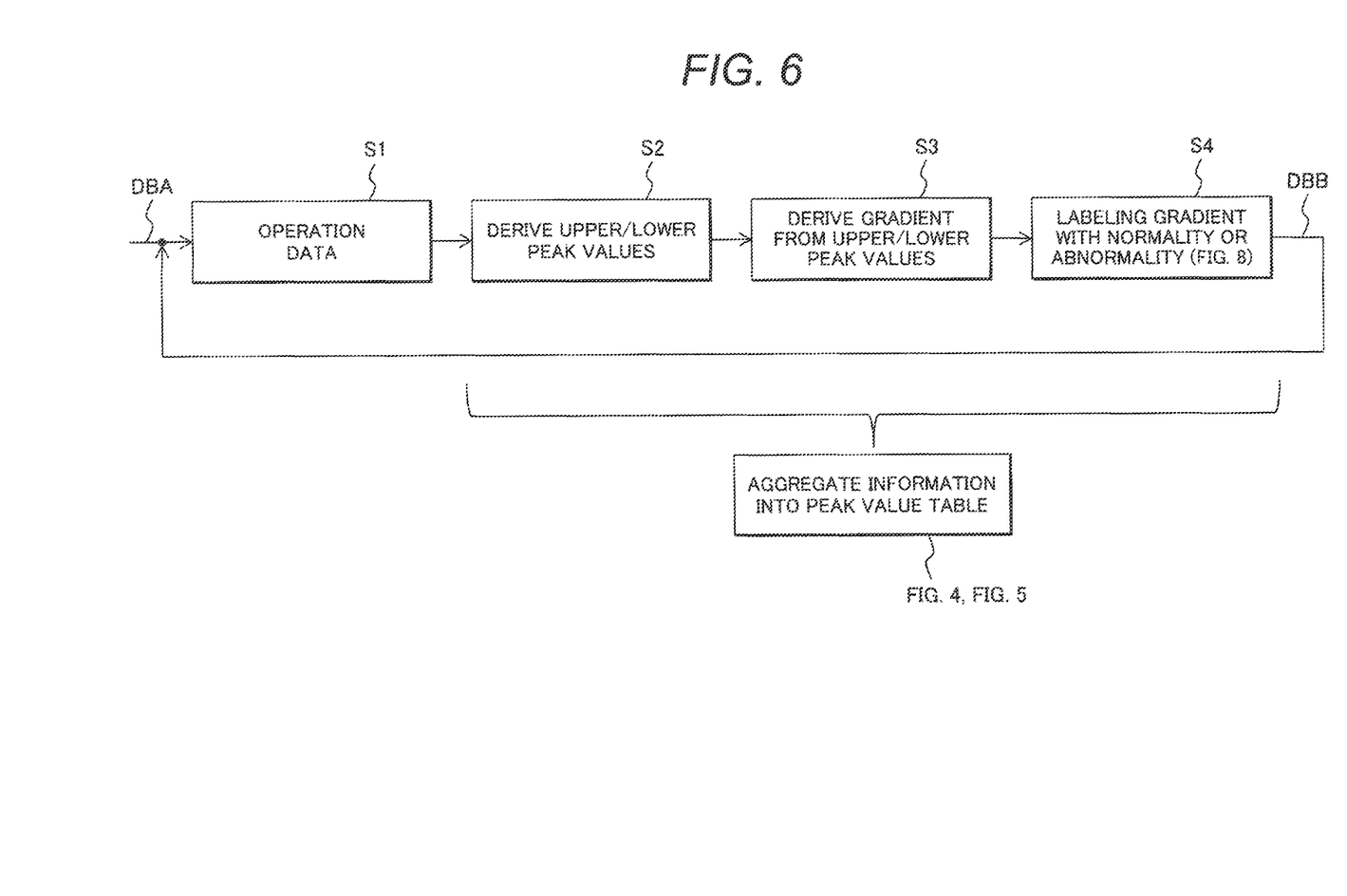
FIG. 6 is a diagram illustrating processing details on processing program Pg.

In the processing program Pg illustrated in FIG. 6 which describes a processing procedure to handle the operation data, the operation data stored in time series is processed into operation data to be evaluated based on the gradient and newly stored in a changed storage format.

Figure 3:
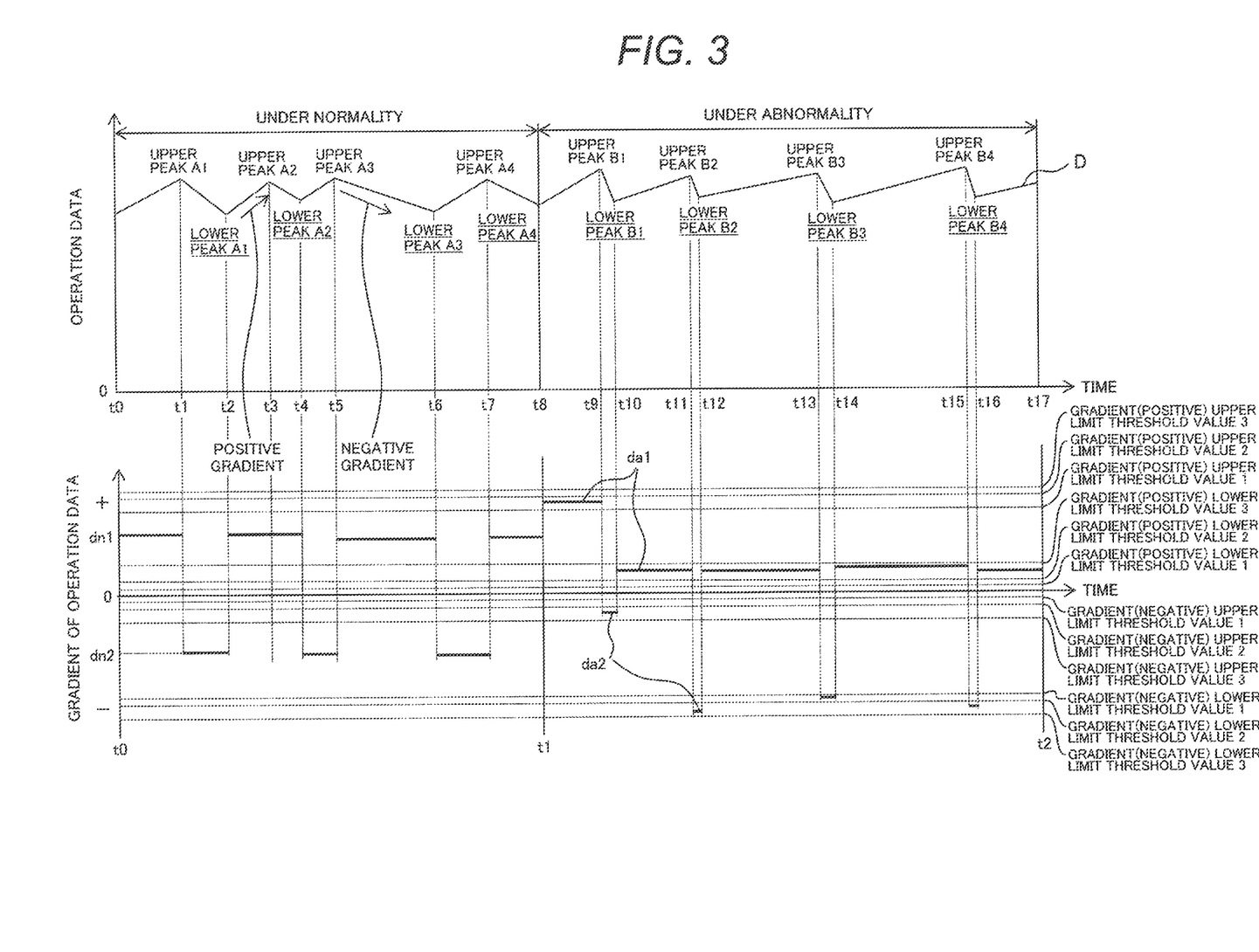
FIG. 3 is a diagram illustrating an example of changes over time in input operation data.

FIG. 3 is a diagram illustrating an example of changes over time in the input operation data D. In an upper portion of FIG. 3, the vertical axis represents magnitude of the operation data D, and the horizontal axis represents time. FIG. 3 shows an instance where the operation data D starts to increase at times with even numbers t0, t2, t4, . . . , and to decrease at times with odd numbers t1, t3, t5, . . . . In FIG. 3, upper and lower peak values at each time are indicated by A1 to A4 in the first half (from time t0 to time t8) and indicated by B1 to B4 in the second half (from time t9 to time t17). It is noted herein that each peak is named for the purpose of classifying all the peaks, such as upper peaks A1, A, A3 and lower peaks A1, A, A3.

In the embodiment, in regard to the operation data D stored in the database DBA in time series, attention is given to the fact that the operation data D alternatively repeats the increase and decrease on time series basis as illustrated in the upper portion of FIG. 3. In a lower portion of FIG. 3, a change rate of increase/decrease in the operation data D (expressed as a gradient in FIG. 3) in each time period is illustrated. It is noted herein that the period of the first half (from time t0 to time t8) means a fluctuation period under normal states, in which it is assumed that each of an increase change rate dn1 and a decrease change rate dn2 during the normal state period take a predetermined value or a value within a predetermined range.

In contrast to this, the period of the second half (from time t9 to time 17) means a fluctuation period under abnormal states, in which the increase change rate da1 and the decrease change rate da2 during the abnormal state period generally take any values not restricted by normal values. In FIG. 3, as illustrated in the example from t8 to t9, the increase change rate da1 under abnormal states is significantly larger than the increase change rate dn1 in the normal state period, and as illustrated in the example from t10 to t11, the increase change rate da1 under abnormal states is significantly smaller than the increase change rate dn1 in the normal state period. Likewise, In FIG. 3, as illustrated in the example from t11 to t12, the decrease change rate da2 under abnormal states is significantly larger than the decrease change rate dn2 in the normal state period, and as illustrated in the example from t9 to t10, the decrease change rate da2 under abnormal states is significantly smaller than the decrease change rate dn2 in the normal state period. The fluctuations of the change rate in each of the increase and decrease directions can be considered to indicate a predictable or analogizable trend of some abnormality in a plant component.

In the processing program Pg in FIG. 6, the time-series operation data D accumulated in the database DBA is evaluated in terms of the gradient and processed and changed to the storage format of the database DBB. The processing program Pg is processed at a computing section in the calculator 1.

The operation data D is firstly stored, together with information on data collection times, in the database DBA of the database DB in the calculator 1 illustrated in FIG. 2. In contrast to this, the storage information after the process in a processing step S1 includes information on the gradient of the operation data D. If necessary, after the gradient of the operation data D is evaluated, the operation data under normal states and the operation data under abnormal states are divided for classifications or storage areas. Then, the storage information is processed, organized, and stored.

Figure 4:
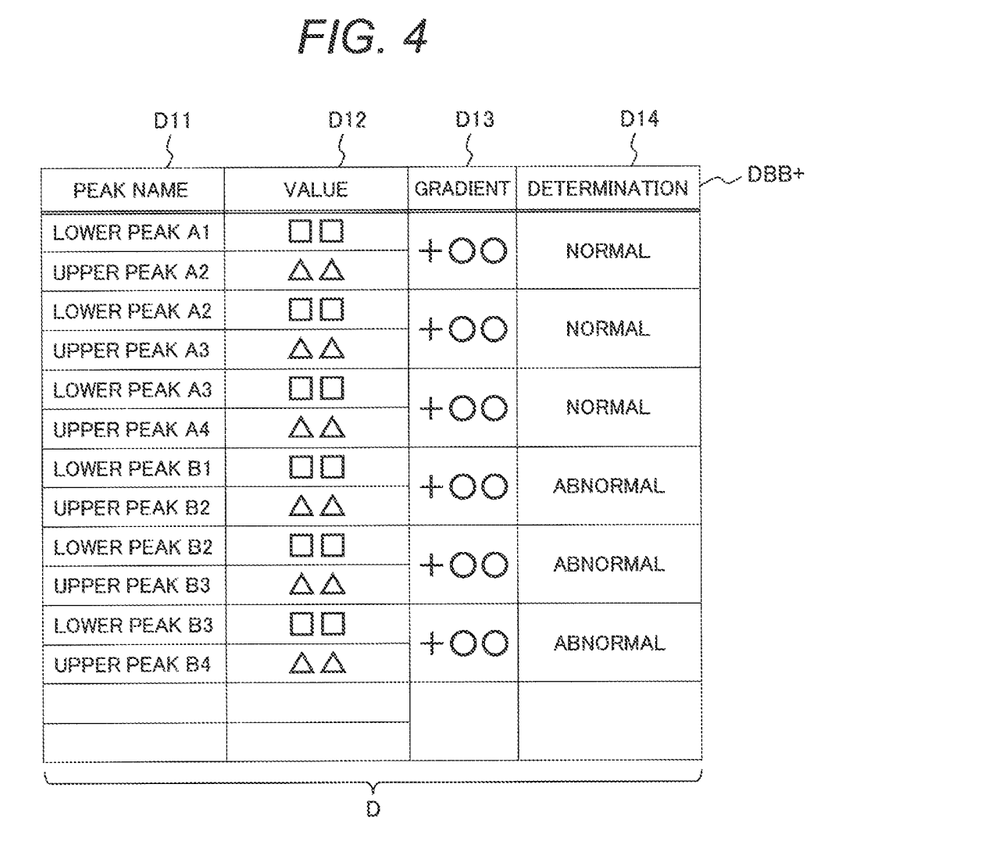
FIG. 4 is a table illustrating an instance (positive side) of manipulating and storing operation data stored in a database DB.
Figure 5:
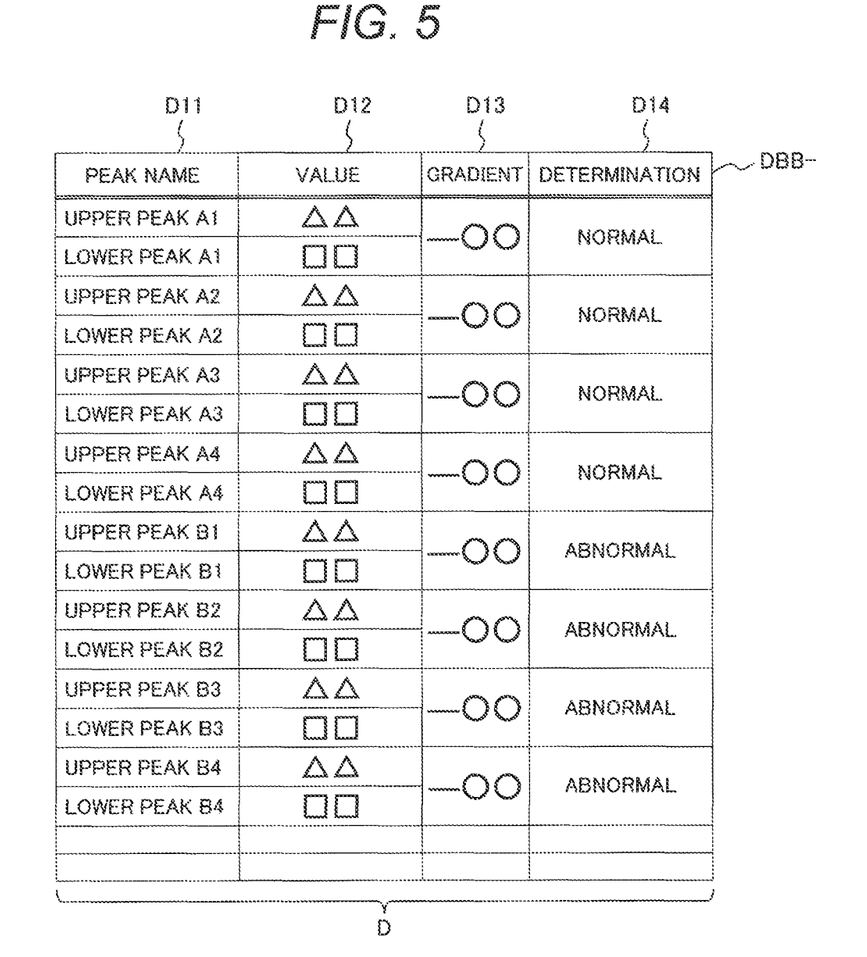
FIG. 5 is a table illustrating an instance (negative side) of manipulating and storing operation data stored in the database DB.

FIG. 4 and FIG. 5 illustrate instances where the operation data D stored in the database DBB is processed and stored. FIG. 4 and FIG. 5 depict that the operation data D of interest is divided into a data group with positive gradients (the increase change rates da1 and dn1) and a data group with negative gradients (the decrease change rates da2 and dn2), which are stored in separate areas of the database DB. In FIG. 4 and FIG. 5, the stored data includes a peak name D11, an operation data value D12, a gradient D13, and a determination result (distinction between abnormality and normality) D14. These data pieces may include time information.

In the processing in FIG. 6, alternate repetition of consecutive local maximum and minimum values of the operation data D is detected by using the time series of one piece of the operation data which has been of interest in the processing step S1. In subsequent processing steps, for the combinations of consecutive maximum and minimum values, times at which the upper and lower peaks (local maximum and minimum values) are reached, values of the upper and lower peaks, and gradients in the increase and decrease directions between the upper and lower peaks are sequentially calculated and stored.

In a processing step S2, each combination of consecutive upper and lower peak values are sequentially called one by one. In a processing step S3, a gradient is calculated from the time duration and a difference between the peak values for each combination. Then, in a processing step S4, it is determined whether the gradient currently calculated is under normal states or under abnormal states by using a number of data about gradients previously calculated and threshold values derived from the gradient data, and then each gradient is labeled with the determination result. The gradient data labeled with the determination result is stored in a positive gradient database DBB+ illustrated in FIG. 4 if the gradient is positive. The gradient data labeled with the determination result is stored in a negative gradient database DBB– illustrated in FIG. 5 if the gradient is negative.

The above processing is sequentially performed on each combination of all the consecutive local maximum and minimum values of the specific operation data and other operation data. Thus, the database DBB is successively expanded and created to store the gradient data after the processing as illustrated in FIG. 4 and FIG. 5.

Figure 7:
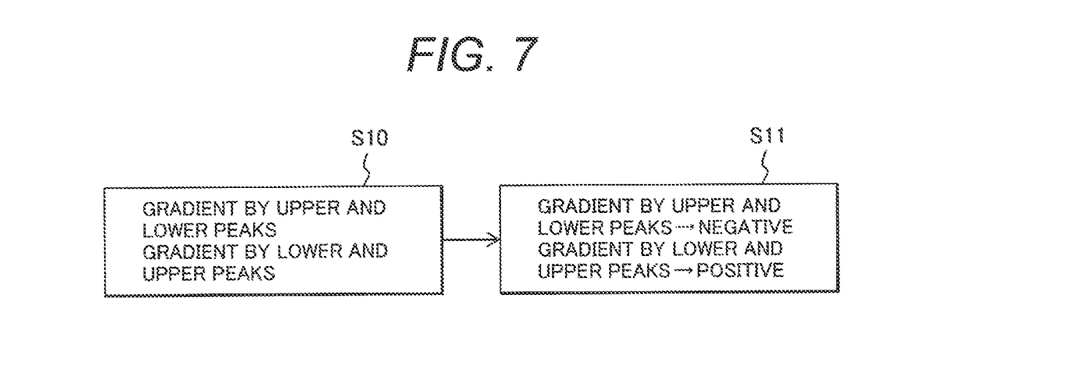
FIG. 7 is a diagram illustrating processing details on determination as to whether storing in a positive gradient database DBB+ or storing in a negative gradient database DBB−.

FIG. 7 illustrates an example of a configuration of a processing portion in the processing program Pg to determine whether to store the gradient data in the positive gradient database DBB+ or in the negative gradient database DBB–. In a processing step S10, the processing determines whether the combination of consecutive upper and lower peak values is a combination in the order of the upper peak and then the lower peak or in the inverse order of the lower peak and then the upper peak. In a processing step S11, based on the determination result, the combination in the order of the upper peak and then the lower peak is stored in the negative gradient database DBB–, and the other combination is stored in the positive gradient database DBB+.

Figure 8:
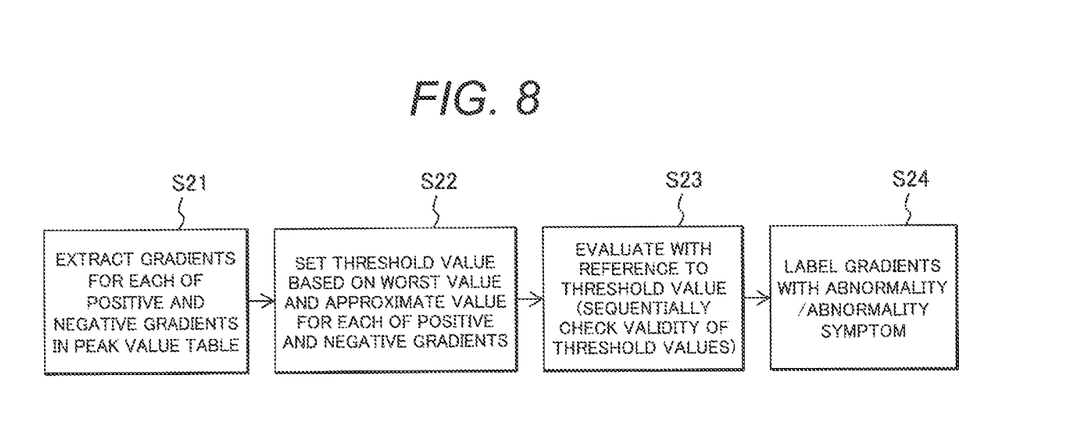
FIG. 8 is a diagram describing specific processing details of a processing step S4 in the processing program Pg.

FIG. 8 describes specific processing details of the processing step S4 in the processing program Pg. In this process, setting is performed of a threshold value to identify a normal value and an abnormal value. It is noted that there are other possible approaches to setting the threshold value. This embodiment describes one such example.

In the processing step 21, data on peak names D11, operation data values D12, and gradients D13 are created in a peak value table in FIG. 4 and FIG. 5, but a determination result (distinction between abnormality and normality) D14 on each individual peak value is not stored in the table. In the processing step S21, for example, the positive gradient peak values in FIG. 4 are of interest. It is noted that after the completion of the series of these processing steps, the negative gradient peak values in FIG. 5 are of interest.

In the processing step S22, attention is given, for example, to a gradient indicating a value deviating from a mean value of the multiple gradients included in the positive gradient peak values in FIG. 4. Further, according to the degree of deviation, for example, a gradient indicating an about 20% or more larger value and a gradient indicating an about 20% smaller value are determined to indicate an undoubted abnormal value, so that ±20% with reference to the mean value is set as a threshold value for abnormality determination. A variety of probability theories and/or statistical approaches can be used for the threshold decision. For example, a threshold value may be set relative to a standard deviation $\sigma$, and four times the standard deviation $\sigma$ may be taken and ±4$\sigma$ may be set to a threshold value for abnormality determination.

The description has been given of a concept how to set a threshold value for abnormality determination. It is obvious that, in a similar manner, a threshold value can be set for identifying a normal value from a data group including normality data without abnormality data. The threshold value may be derived from the undoubted abnormality data. It is noted that abnormality occurrence in plant data, which can momentarily vary to a large extent, often shows a symptom trend of progress in the level of abnormality with time in general. Considering that the symptom trend is shown, the threshold values may be preferably set in multiple stages rather than a single stage so that symptom stages up to abnormality are visible.

For the gradient of the operation data shown in the lower portion of FIG. 3, the values dn1, dn2 under normal states and the values da1, da2 under abnormal states are denoted. It is also shown that the threshold values for identifying the values da1, da2 under abnormal states are set as threshold values of three stages for each of the upper limit and the lower limit of the gradients for each of positive and negative gradients. Therefore, when a temporal trend is shown and confirmed that, after the gradient of the operation data exceeds a first stage threshold value, the gradient of the operation data exceeds a second stage threshold value larger than the first stage threshold value, abnormality is progressing in this situation and abnormality symptoms can be grasped.

In a processing step S23, gradient data on which a normality/abnormality determination flag D14 is not set is evaluated based on the set threshold values. In a processing step S24, in particular, the data determined to be abnormal is labeled with abnormality or abnormality prediction stage, and the database illustrated in FIG. 4 and FIG. 5 is constructed. Subsequently, similar processing is performed on the negative gradient peak values in FIG. 5.

Through the series of the above processing steps, a database is created for each of positive gradient and negative gradient. For each data group, individually different threshold values are determined for each of the positive gradient and the negative gradient and thus abnormalities and/or abnormality symptom levels are determined to perform data classification. It is noted that accuracy of setting the threshold values for abnormality/normality is higher as the number of samples is increasing. Because of this reason, it is preferred that the processing in FIG. 8 is repeatedly performed at appropriate intervals.

According to the embodiment, when the operation data is the electric conductivity of stator cooling water of the generator, for example, the case where the positive gradient goes beyond a lower limit and the case where the negative gradient goes beyond an upper limit can be independently monitored. In the former case, conceivable reasons why the gradient of the electric conductivity goes beyond the lower limit are considered as deterioration of ion exchanger resin, clogging of a line passing through ion exchanger resin, ionization of a flashing component of a stator cooling line, and so on. In the latter case, conceivable reasons why the gradient of the electric conductivity goes beyond the upper limit are considered as an excess amount of injection (overloading) of ion exchanger resin, clogging of a line not passing through ion exchanger resin, and so on.

Further, when the operation data is the degree of purity of hydrogen gas filled in the generator, for example, when the positive gradient goes beyond the lower limit, there is a possibility of deterioration of silica gel in the hydrogen gas dryer. Also, in reference to the degree of purity of the hydrogen gas, in case where two (upper and lower limits) threshold values are set for each of the positive gradient and the negative gradient, when the positive gradient goes beyond the lower limit, there is a possibility of deterioration of silica gel in the hydrogen gas dryer. When the positive gradient goes beyond the upper limit, there is a possibility of abnormal states in which heat of a heater in the hydrogen gas dryer and/or wind from a blower are excessively produced as compared to a normal state. Further, in general, because the threshold values are different among the occurrence events, this technology will contribute to determining the cause of occurrence of abnormality symptoms.

According to the embodiment described above, upper and lower limit peak values are detected from the operation data on a plant component, a (positive/negative) gradient of the upper and lower limit peak values is calculated, and the gradient is monitored over time, thereby enabling performance of highly reliable detection of equipment deterioration and/or abnormality symptoms and/or abnormalities. As a result, it can be expected to be useful in increasing the reliability of plant components and preventive maintenance of plant components.

In addition, performing the abnormality determination separately for each of the positive gradient and the negative gradient enables setting of an appropriate threshold values for each of the positive gradient and the negative gradient. Specifically, an upper limit and a lower limit for the positive gradient and an upper limit and a lower limit for the negative gradient can be set. Further, multiple stages (multiple threshold values) may be provided for each of the upper and lower limits. And, for each of the positive gradient and the negative gradient, the upper limits and the lower limits can be used to detect different abnormality symptoms and/or abnormalities from each other. For example, when a gradient is positive, the lower limits can be used to detect an event different from abnormality symptoms and/or abnormalities which can be detected based on the upper limits.

REFERENCE SIGNS LIST

1 . . . Plant operation data monitoring device (calculator)
2 . . . Plant equipment
G . . . Generator
T . . . Turbine
B . . . Boiler
GA . . . Generator auxiliary
TA . . . Turbine auxiliary
BA . . . Boiler auxiliary
C . . . Condenser
G1 . . . Generator excitation circuit

What is claimed is:

1. A device for improving reliability of a thermal power plant, the device comprising:
   an input section that receives operation data on the thermal power plant;
   a database that stores the operation data received, wherein the database comprises a first database and a second database; and
   a calculator that is communicatively coupled to the input section and the database,
   wherein the calculator is configured to:
   store the operation data received in the first database in time series,
   calculate gradients from peak values of the operation data stored,
   store the gradients in the second database in time series, and
   determine threshold values for abnormality determination about each of the gradients, wherein an abnormality occurs when the threshold values are violated,
   divide each of the gradients into normal values and abnormal values to form divided gradients, wherein the divided gradients are formed based on whether a respective gradient is a positive gradient or a negative gradient,
   store the divided gradients in the second database for the positive gradients or the negative gradients,
   set a first upper limit and a first lower limit for the positive gradient,
   set a second upper limit and a second lower limit for the negative gradient,
   perform the abnormality determination separately for each of the positive gradients and the negative gradients by using the first upper limit and the first lower limit, and the threshold values for the positive gradient and using the second upper limit and the second lower limit, and the threshold values for the negative gradient, and
   determine the abnormality to have progressed by confirming a temporal trend,
   wherein preventative maintenance is performed on the thermal power plant based on the abnormality determination and the temporal trend.

2. The device according to claim 1,
   wherein the threshold values for the positive gradient and the threshold values for the negative gradient each includes
   multiple threshold values for each of the positive gradients and the negative gradients.

3. The device according to claim 1, wherein the thermal power plant includes main machinery, wherein the main machinery comprises at least one of a generator, a turbine or a boiler.

4. The device according to claim 3, wherein the thermal power plant further includes auxiliaries, wherein the auxiliaries include at least one of an auxiliary generator, an auxiliary turbine, an auxiliary boiler, a condenser, or a generator excitation circuit.

5. The device according to claim 4, wherein the preventive maintenance is performed on at least one of the main machinery or the auxiliaries.

6. A method for improving reliability of a thermal power plant, the method comprising:
   receiving operation data on the thermal power plant;
   storing the operation data received in a first database in time series;
   calculating gradients from peak values of the operation data stored,
   storing the gradients in a second database in time series, and
   determining threshold values for abnormality determination about each of the gradients, wherein an abnormality occurs when the threshold values are violated;
   dividing each of the gradients into normal values and abnormal values to form divided gradients, wherein the divided gradients are formed based on whether a respective gradient is a positive gradient or a negative gradient;
   storing the divided gradients in the second database for the positive gradients or the negative gradients;
   setting a first upper limit and a first lower limit for the positive gradient,
   setting a second upper limit and a second lower limit for the negative gradient;
   performing the abnormality determination separately for each of the positive gradients and the negative gradients by using the first upper limit, the first lower limit, and the threshold values for the positive gradient and using the second upper limit, the second lower limit, and the threshold values for the negative gradient;
   determining the abnormality to have progressed by confirming a temp oral trend; and
   performing preventative maintenance on the thermal power plant based on the abnormality determination and the temporal trend.

7. The method according to claim 6, wherein the thermal power plant includes main machinery, wherein the main machinery comprises at least one of a generator, a turbine or a boiler.

8. The method according to claim 7, wherein the thermal power plant further includes auxiliaries, wherein the auxiliaries include at least one of an auxiliary generator, an auxiliary turbine, an auxiliary boiler, a condenser, or a generator excitation circuit.

9. The method according to claim 8, wherein the preventive maintenance is performed on at least one of the main machinery or the auxiliaries.

\* \* \* \* \*